United States Patent
Alexeev et al.

(10) Patent No.: US 12,339,460 B2
(45) Date of Patent: *Jun. 24, 2025

(54) ANGULAR UNIFORMITY WAVEGUIDE FOR AUGMENTED OR VIRTUAL REALITY

(71) Applicant: Snap Inc., Santa Monica, CA (US)

(72) Inventors: Arseny Alexeev, Abingdon (GB); Sebastien De Cunsel, Abingdon (GB); Sophia Fox, Abingdon (GB); Choon How Gan, Abingdon (GB); Ciaran Phelan, Wallingford (GB); Gleb Siroki, Abingdon (GB); Mohmed Salim Valera, Sutton Coldfield (GB); Kai Wang, Abingdon (GB)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,415

(22) Filed: Mar. 5, 2024

(65) Prior Publication Data
US 2024/0210704 A1    Jun. 27, 2024

Related U.S. Application Data

(63) Continuation of application No. 17/439,978, filed as application No. PCT/GB2020/050246 on Feb. 3, 2020, now Pat. No. 11,953,685.

(30) Foreign Application Priority Data

Mar. 19, 2019   (GB) ..................................... 1903708

(51) Int. Cl.
   *G02B 27/01*   (2006.01)
   *G02B 27/42*   (2006.01)
(52) U.S. Cl.
   CPC ..... *G02B 27/0172* (2013.01); *G02B 27/4205* (2013.01); *G02B 27/4272* (2013.01)

(58) Field of Classification Search
   CPC ............ G02B 27/0172; G02B 27/4205; G02B 27/4272
   See application file for complete search history.

(56) References Cited

U.S. PATENT DOCUMENTS 7,704,644 B2 *  4/2010  Schneider ................ G03H 1/10
                                                        430/1
8,160,411 B2 *  4/2012  Levola ............... G02B 27/0172
                                                       359/569

(Continued)

FOREIGN PATENT DOCUMENTS

CN        212460098 U      2/2021
CN        113646687 A     11/2021

(Continued)

OTHER PUBLICATIONS

"U.S. Appl. No. 17/439,978, Non Final Office Action mailed Sep. 21, 2023", 11 pgs.

(Continued)

*Primary Examiner* — Rhonda S Peace
(74) *Attorney, Agent, or Firm* — Schwegman Lundberg & Woessner, P.A.

(57) ABSTRACT

There is disclosed a waveguide for use in an augmented reality or virtual reality display. The waveguide comprises a plurality of optical structures in a photonic crystal. The plurality of optical structures are arranged in an array to provide at least two diffractive optical elements. Each of the two diffractive optical elements is configured to receive light from an input direction and couple it towards the other diffractive optical element which can then act as an output diffractive optical element, providing outcoupled orders towards a viewer. The plurality of optical structures respectively have a shape, when viewed in the plane of the waveguide, comprising twelve substantially straight sides, six of the sides having respective normal vectors at a first (Continued)

angle, and the other six of the sides having respective normal vectors at a second angle which is different to the first angle.

20 Claims, 16 Drawing Sheets

(56) References Cited

U.S. PATENT DOCUMENTS

| | | | |
|---|---|---|---|
| 8,358,895 | B2 | 1/2013 | Noda et al. |
| 10,634,925 | B2 | 4/2020 | Grey et al. |
| 11,237,393 | B2 | 2/2022 | Bhargava et al. |
| 11,487,111 | B2 | 11/2022 | Grey et al. |
| 11,543,594 | B2 | 1/2023 | Grant et al. |
| 11,953,685 | B2 * | 4/2024 | Alexeev ............ G02B 27/4272 |
| 2010/0321781 | A1 | 12/2010 | Levola et al. |
| 2018/0052501 | A1 | 2/2018 | Jones, Jr. et al. |
| 2018/0210205 | A1 | 7/2018 | Grey et al. |
| 2021/0382308 | A1 | 12/2021 | Phelan et al. |
| 2022/0171193 | A1 | 6/2022 | Alexeev et al. |

FOREIGN PATENT DOCUMENTS

| | | |
|---|---|---|
| CN | 113646687 B | 4/2023 |
| EP | 3942346 A1 | 1/2022 |
| EP | 3942346 B1 | 5/2024 |
| JP | 2009163114 A | 7/2009 |
| TW | 202040215 A | 11/2020 |
| TW | I737204 B | 8/2021 |
| WO | WO-2016020643 A1 | 2/2016 |
| WO | WO-2018178626 A1 | 10/2018 |
| WO | WO-2018231754 A1 | 12/2018 |
| WO | WO-2020188234 A1 | 9/2020 |

OTHER PUBLICATIONS

"U.S. Appl. No. 17/439,978, Notice of Allowance mailed Dec. 6, 2023", 9 pgs.
"U.S. Appl. No. 17/439,978, Preliminary Amendment filed Sep. 16, 2021", 7 pgs.
"U.S. Appl. No. 17/439,978, Response filed Oct. 4, 2023 to Non Final Office Action mailed Sep. 21, 2023", 11 pgs.
"International Application Serial No. PCT/GB2020/050246, International Preliminary Report on Patentability mailed Jun. 9, 2021", 8 pgs.
"International Application Serial No. PCT/GB2020/050246, International Search Report mailed May 8, 2020", 3 pgs.
"International Application Serial No. PCT/GB2020/050246, Response filed Mar. 15, 2021 to Written Opinion mailed Jan. 27, 2021", 9 pgs.
"International Application Serial No. PCT/GB2020/050246, Response filed May 11, 2021 to Written Opinion mailed Apr. 13, 2021", 10 pgs.
"International Application Serial No. PCT/GB2020/050246, Response to Written Opinion and Article 34 Amendments filed Dec. 14, 2020", 9 pgs.
"International Application Serial No. PCT/GB2020/050246, Written Opinion mailed Jan. 27, 2021", 7 pgs.
"International Application Serial No. PCT/GB2020/050246, Written Opinion mailed Apr. 13, 2021", 6 pgs.
"International Application Serial No. PCT/GB2020/050246, Written Opinion mailed May 8, 2020", 7 pgs.
"European Application Serial No. 20705466.9, Response to Communication pursuant to Rules 161(1) and 162 EPC filed Nov. 15, 2021", 38 pgs.

* cited by examiner

ANGULAR UNIFORMITY WAVEGUIDE FOR AUGMENTED OR VIRTUAL REALITY

CLAIM OF PRIORITY

This application is a continuation of U.S. patent application Ser. No. 17/439,978, filed on Sep. 16, 2021, which is a U.S. national-phase application filed under 35 U.S.C. § 371 from International Application Serial No. PCT/GB2020/050246, filed on Feb. 3, 2020, and published as WO 2020/188234 on Sep. 24, 2020, which claims the benefit of priority to United Kingdom Application Serial No. 1903708.4, filed on Mar. 19, 2019, each of which is incorporated herein by reference in its entirety.

TECHNICAL FIELD

The present invention relates to a waveguide for use in an augmented reality or virtual reality display. In particular, the invention relates to a waveguide in which input light is expanded in two orthogonal directions in an output element and is coupled out of a waveguide towards a viewer. This can allow physical expansion of the eyebox in an augmented reality display.

BACKGROUND

An augmented reality display allows a user to view their surroundings as well as projected images. In military or transportation applications the projected images can be overlaid on the real world perceived by the user. Other applications for these displays include video games and wearable devices, such as glasses.

In a normal augmented reality set-up a transparent display screen is provided in front of a user so that they can continue to see the physical world. The display screen is typically a glass waveguide, and a projector is provided to one side. Light from the projector is coupled into the waveguide by a diffraction grating. The projected light is totally internally reflected within the waveguide. The light is then coupled out of the waveguide by another diffraction grating so that it can be viewed by a user. The projector can provide information and/or images that augment a user's view of the physical world.

An optical device is disclosed in WO 2016/020643 for expanding input light in two dimensions in an augmented reality display. An input diffractive optical element is provided for coupling input light from a projector into a waveguide. The optical device also includes an output element having two diffractive optical elements overlaid on one another in the waveguide so that each of the two diffractive optical elements can receive light from the input diffractive optical element and couple it towards the other diffractive optical element in the pair, which can then act as an output diffractive optical element which couples light out of the waveguide towards a viewer. In one embodiment the two diffractive optical elements overlaid on one another are provided in a photonic crystal. This is achieved by having an array of pillars arranged within or on the surfaces the waveguide, having an increased refractive index relative to the surrounding waveguide medium. The pillars in WO 2016/020643 are described as having a circular cross-sectional shape when viewed in the plane of the waveguide, from the perspective of a viewer. This arrangement has been found to be very effective at simultaneously expanding light in two dimensions and coupling light out of the waveguide. Advantageously this can improve the use of space on the waveguide which can decrease the cost of manufacture.

One issue that has been identified with known waveguides because a central strip in the output image has been observed as having a higher relative brightness than other parts. This "striping" effect is undesirable for users, and an object of the present invention is to overcome and mitigate this issue.

The optical device disclosed in WO 2018/178626 aims to solve this problem. In this arrangement the pillars of WO 2016/020643 are replaced with an array of different shaped polygons, such as a parallelogram or a modified parallelogram.

Despite being able to reduce the central "striping effect" these waveguides still suffer from the issue of reduced angular uniformity of colours across the field of view.

Regions towards the edge of the field of view display a lower intensity than regions closer to the centre. It is desirable that the angular uniformity is consistent across the user's field of view to provide the user with the most enhanced viewing experience. An arrangement which prevents the central "striping effect" whilst also ensuring improved angular uniformity is desired.

SUMMARY OF INVENTION

According to an aspect of the invention, there is provided a waveguide for use in an augmented reality or virtual reality display, comprising: a plurality of optical structures in a photonic crystal; wherein the plurality of optical structures are arranged in an array to provide at least two diffractive optical elements, wherein each of the two diffractive optical elements is configured to receive light from an input direction and couple it towards the other diffractive optical element which can then act as an output diffractive optical element, providing outcoupled orders towards a viewer; wherein the plurality of optical structures respectively have a shape, when viewed in the plane of the waveguide, comprising twelve substantially straight sides, six of the sides having respective normal vectors at a first angle, and the other six of the sides having respective normal vectors at a second angle which is different to the first angle.

In this way, the arrangement of the optical structures can provide an improved angular uniformity of colours across the field of view. This improves the waveguide's performance as there is a more uniform intensity of light coupled out of the waveguide across the full angular range. This provides the user with a more uniform display across their entire viewing range.

In addition, the waveguide can reduce the proportion of light that is diffracted into an order which causes the striping effect. This can improve the diffraction efficiency of the overlaid diffractive optical elements, increasing the proportion of light that is turned and coupled towards the other diffractive optical element. This can mitigate the striping effect that has been observed with known waveguides having optical structures with a circular cross-sectional shape. This can also improve the overall efficiency of the waveguide by controlling the light coupled towards the user for viewing.

Preferably, the at least two diffractive optical elements are overlaid on one another in or on the waveguide The optical structures may have a cross type shape. The cross shape made of two intersecting lines substantially at 120 degrees to one another.

Preferably, the shape has internal angles that may add up to substantially 1800°. In this way the shape of each of the optical structures may be substantially a dodecagon. The shape may have substantially four internal angles of 60°, substantially four internal angles of 120°, substantially two internal angles of 240°, and substantially two internal angles of 300°.

The optical structures in the array may be spaced apart from each another by a gap in a direction parallel to the optical elements. The optical structures may have a physical extent that extends in the direction parallel to the optical elements, wherein the sum of the physical extent and the gap defines a lattice constant and the gap may be defined as a ratio of the lattice constant. In some arrangements the gap is 10% of the lattice constant. In other arrangements the gap is 20% of the lattice constant. In other arrangements the gap may be between 1 to 50% of the lattice constant.

With this arrangement, there is a spacing between each of the plurality of optical structures. In other words, each of the optical structures are not in direct contact with each other. The lattice constant defines one side of a unit cell, where the unit cell defines the arrangement of the optical structures.

Preferably, the first angle and the second angle are at substantially ±30° to the input direction. It has been found that this arrangement can advantageously improve diffraction efficiency into the required orders and mitigate striping and further improve angular uniformity.

At least some of the plurality of optical structures may respectively include a side that is attached to a side of a respective neighbouring optical structure. In some arrangements, at least some of the plurality of optical structures are attached to their four nearest neighbouring optical structures.

In this way, adjacent optical structures having a cross shape are joined at four of their sides to the nearest neighbour cross shaped optical structure. This results in the optical structures forming a grid shape. In other words, the spacing between adjacent optical structures is zero. It can be considered that there is a continuous connection between neighbouring optical structures through four of their sides.

Advantageously, having a grid shape may improve the ease in manufacturing the optical structures. In addition, this arrangement may provide improved extraction efficiency, by making more efficient use of the input light. However, in some cases the greatest angular uniformity may be provided by the plurality of optical structures each having a cross structure, and being spaced apart from one another.

Preferably, the waveguide comprises an input diffractive optical element, separate from the at least two diffractive optical elements overlaid on one another in the waveguide, configured to couple light into the waveguide and to provide light to the plurality of optical structures in the array in the input direction.

The input diffractive optical element is preferably a diffraction grating comprising grooves in one surface of the waveguide. Preferably the input grating has a high efficiency for coupling light into the waveguide.

The array of optical structures in the waveguide may be referred to as a photonic crystal. The waveguide may be provided within an optical display.

The plurality of optical structures may exhibit differences in refractive index from a surrounding waveguide medium. In this way, the optical structures can be embedded within a waveguide and their diffractive properties can be created due to a difference in refractive index between the structures and the waveguide medium.

In most arrangements the refractive index of the waveguide may be greater than 1.5.

The plurality of optical structures may be surface relief structures on the surface of the waveguide. The mismatch between the refractive index of the surface relief features and the air that surrounds them may provide the desired diffractive properties. In some embodiments a coating may be provided on the optical structures in order to further control diffraction efficiency.

According to a further aspect of the invention, there is provided a method of manufacture of a waveguide for an augmented reality or virtual reality display, comprising the steps of: providing a plurality of optical structures in a photonic crystal; arranging the plurality of optical structures in an array to provide at least two diffractive optical elements, wherein each of the two diffractive optical elements is configured to receive light from an input direction and couple it towards the other diffractive optical element which can then act as an output diffractive optical element, providing outcoupled orders towards a viewer; and providing the plurality of optical structures respectively with a shape, when viewed in the plane of the waveguide, comprising twelve substantially straight sides, a first half of the sides having respective normal vectors at a first angle, and a second half of the sides having respective normal vectors at a second angle which is different to the first angle.

Preferably, the method comprises the step of applying a coating to the plurality of optical structures.

Preferably, the at least two diffractive optical elements are overlaid on one another in or on the waveguide According to a further aspect there is provided an augmented reality or virtual reality display, comprising the waveguide of the aspect described above. The augmented reality or virtual reality display may in some cases be an augmented reality or virtual reality headset, glasses or googles.

DETAILED DESCRIPTION

Figure 1:
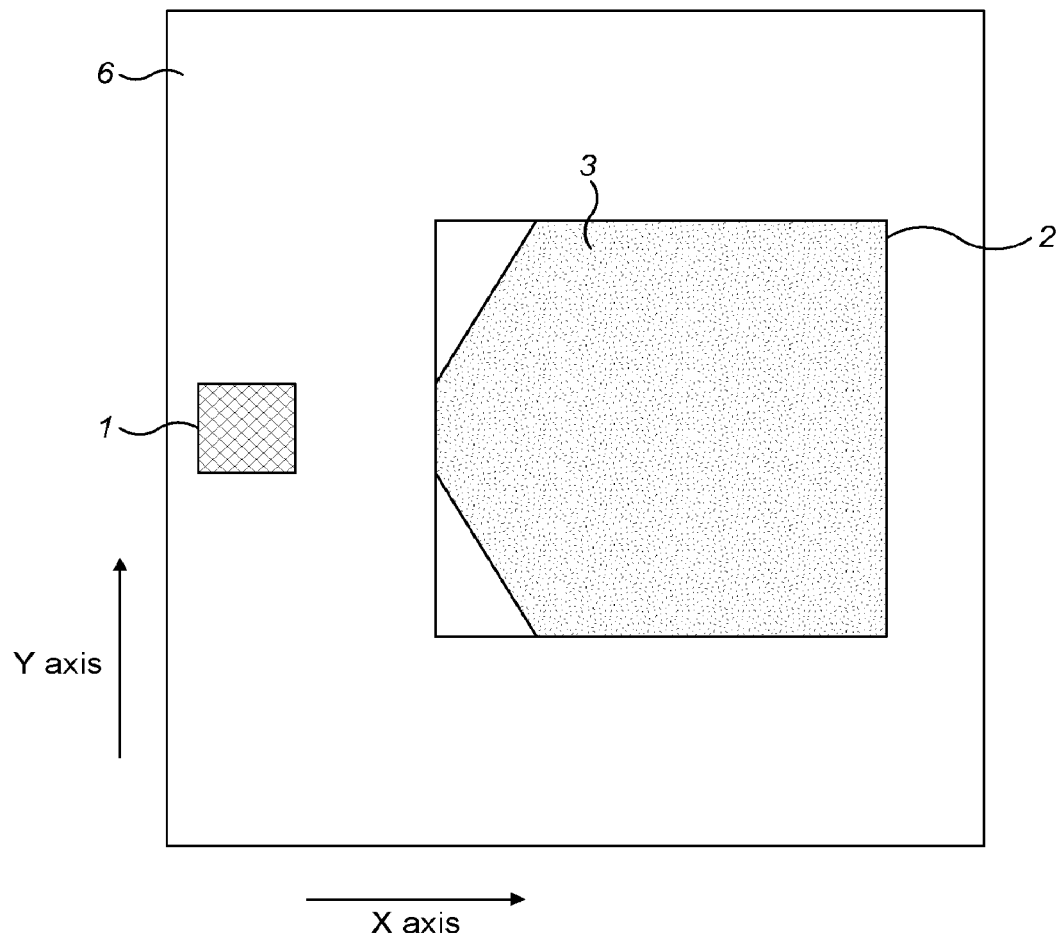
FIG. 1 is a top view of a known waveguide.
Figure 2:
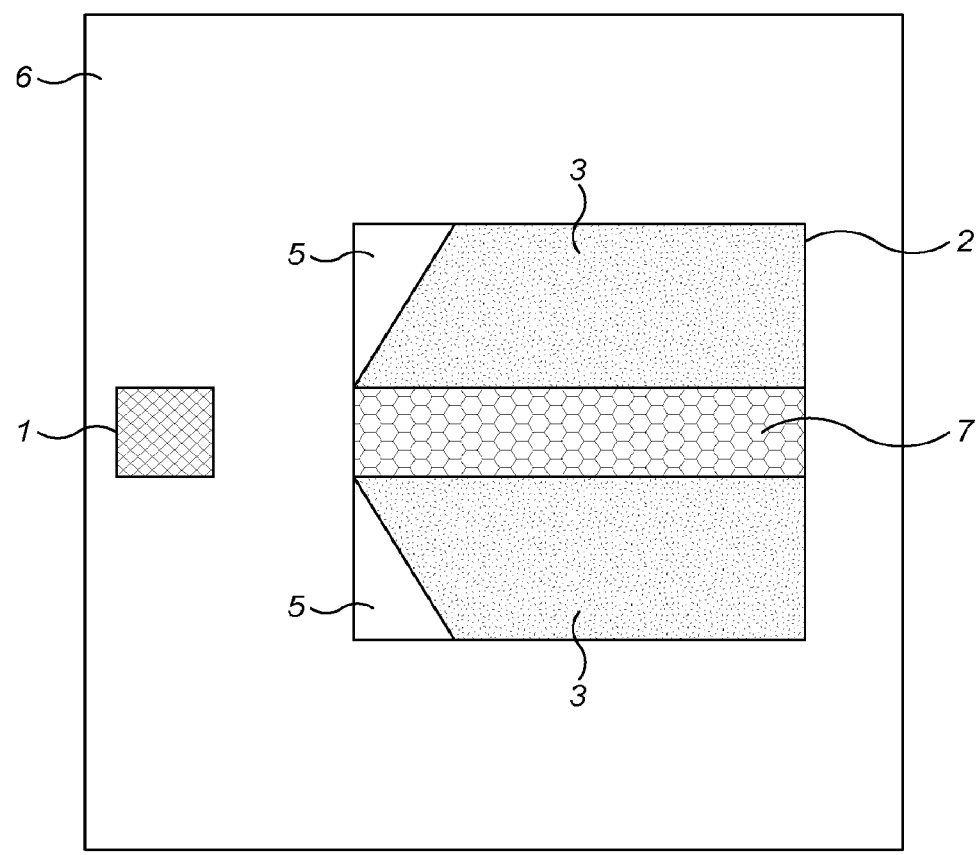
FIG. 2 is another top view of a known waveguide.

FIGS. 1 and 2 are top views of a known waveguide 6. An input diffraction grating 1 is provided on a surface of the waveguide 6 for coupling light from a projector (not shown) into the waveguide 6. Light that is coupled into the waveguide travels by total internal reflection towards an output element 2 which includes a photonic crystal 3. In this example the photonic crystal 3 includes pillars (not shown) having a circular cross-sectional shape from the perspective of these top views. The pillars have a different refractive index relative to the refractive index of the surrounding waveguide medium and they are arranged in an array having hexagonal symmetry.

When light encounters the photonic crystal 3 in the output element 2 from the input diffraction grating along the x-axis it is either transmitted or turned through ±60° by one of the diffractive optical structures formed by the array in the photonic crystal 3.

It has been found that the output image diffracted from element 2 includes a central stripe 7 which has a higher relative brightness than other parts. It is believed that this effect is created due to the diffraction efficiencies of the diffractive optical structures formed by the array in the photonic crystal 3. In particular, it is believed that a significant proportion of light received from the input diffraction grating 1 is diffracted to the eye when it encounters the photonic crystal 3, rather than being diffracted and turned through ±60°.

Figure 3A:
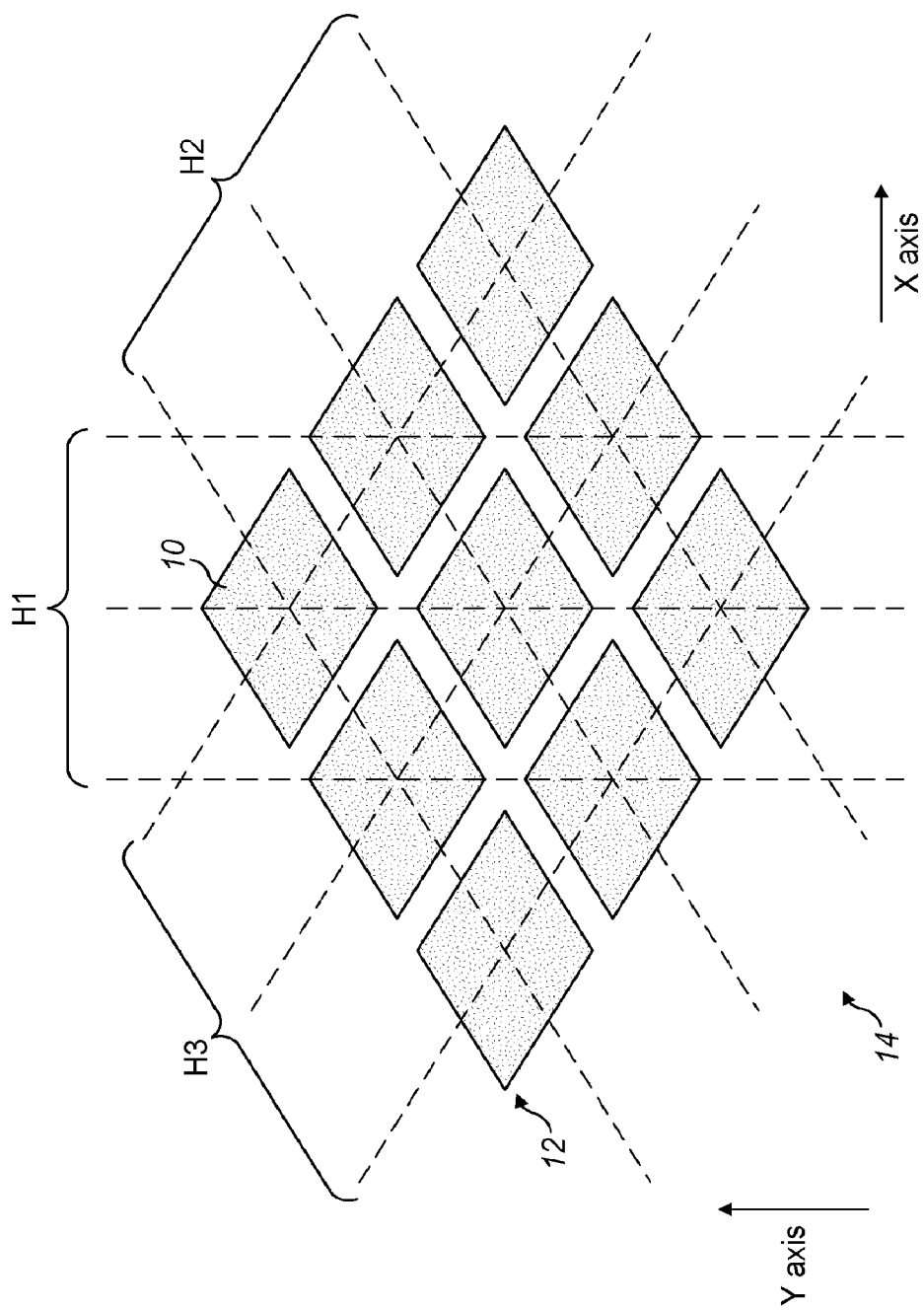
FIGS. 3(a) and (b) are top views of two photonic crystals for use in a known waveguide.
Figure 3B:
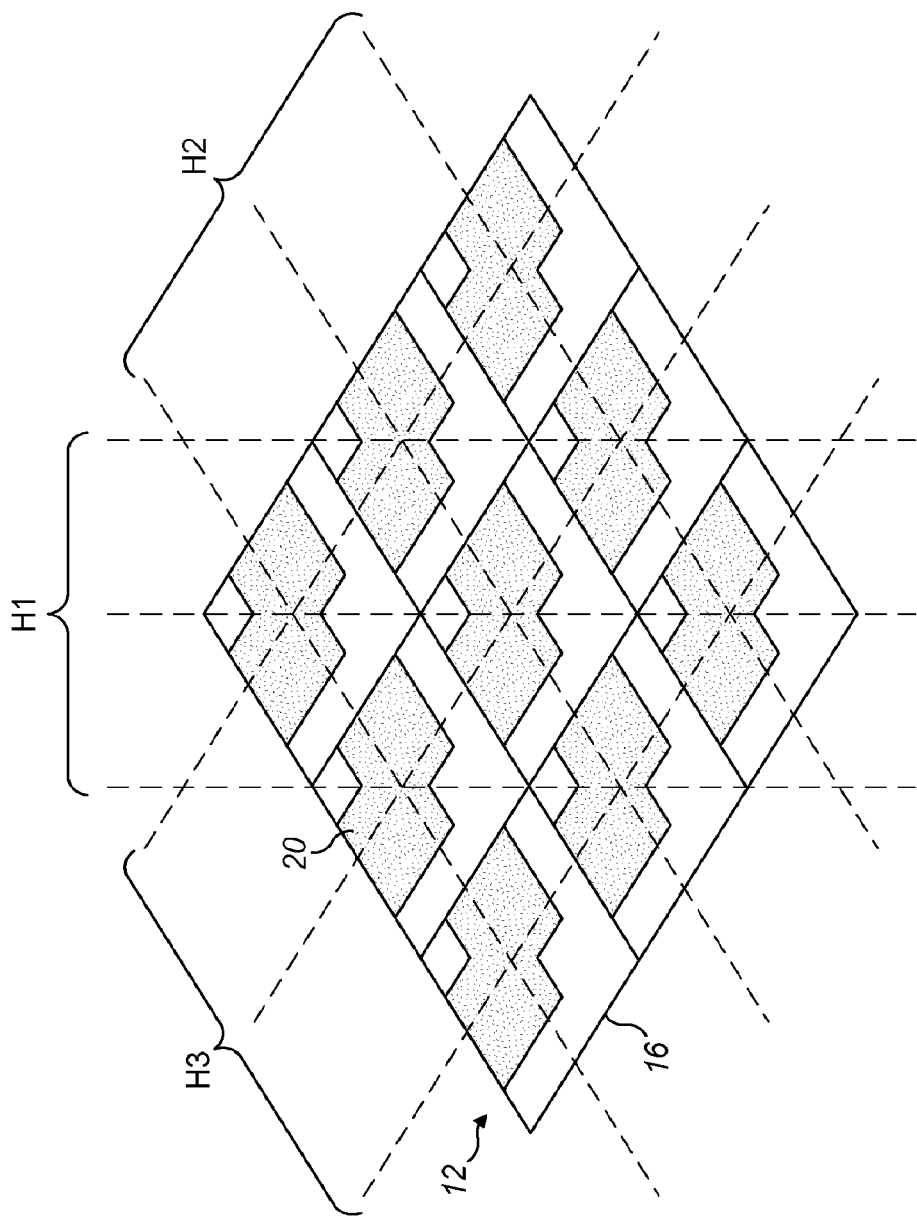

FIGS. 3(a) and (b) show two prior art arrangements of optical structures that have been found to reduce the significant proportion of the light being in the central stripe. The optical structures 10 in FIG. 3a are parallelograms having four substantially straight sides and four vertices. In FIG. 3b the optical structures 20 are modified parallelograms each having a pair of central notches 22.

Figure 4:
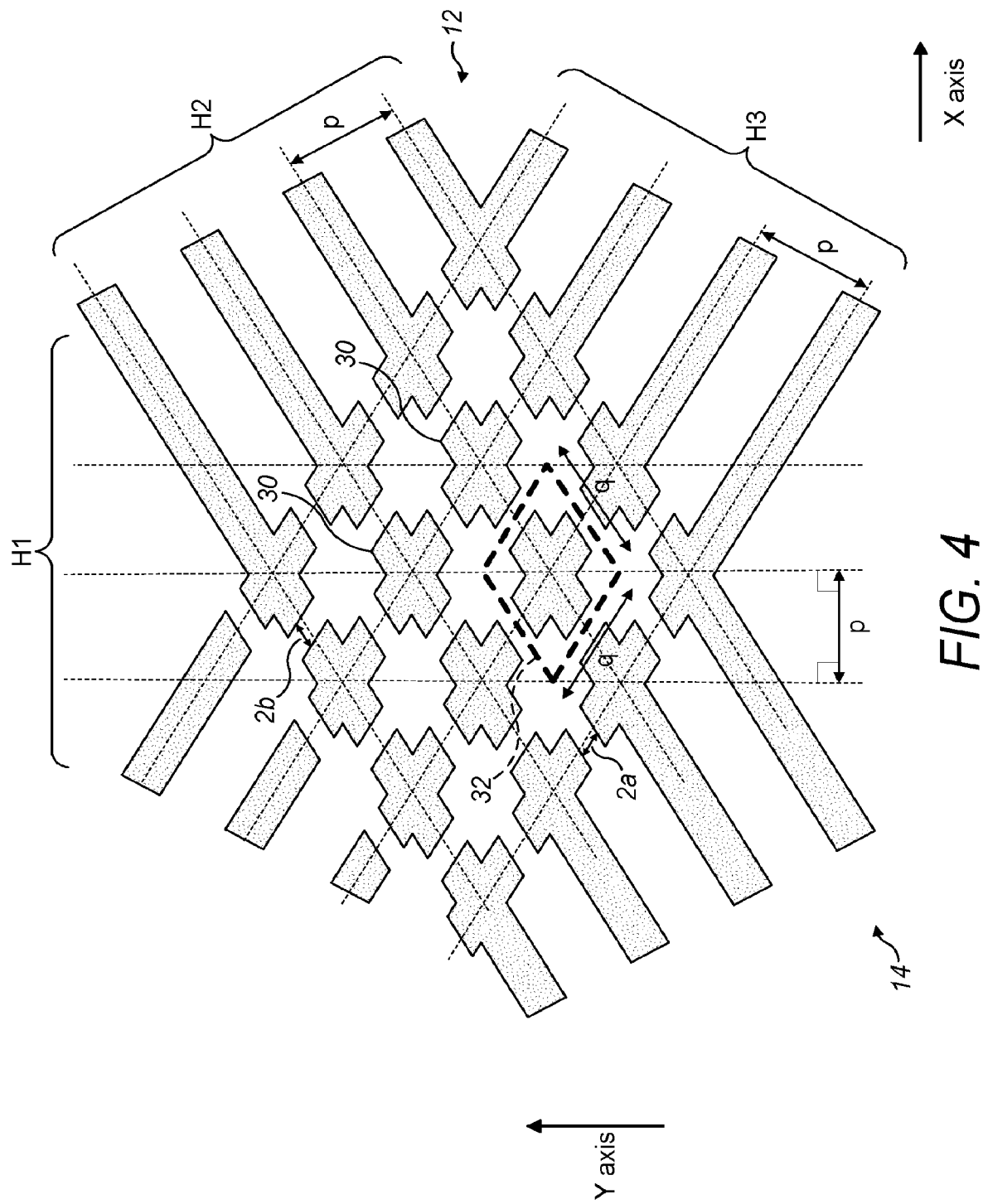
FIG. 4 is a top view of a photonic crystal for use in a waveguide in an embodiment of the invention.

FIG. 4 is a top view of part of a photonic crystal 12, which is an array of optical structures 30 that are provided within a waveguide 14 according to an embodiment of the present invention. The waveguide 14 may have a low refractive index, with n greater than 1.5. The optical structures 30 in this arrangement are a cross or "x" shape having twelve substantially straight sides. The optical structures 30 have substantially the same cross-sectional shape across the width of the waveguide. In other embodiments the optical structures 30 may be provided across only a portion of the width of the waveguide 14.

In one embodiment the optical structures 30 can be provided on one surface of the waveguide 14. In this arrangement the optical structures 30 can have a feature height so that they project from the surface of the waveguide 14. It has been found that an effective photonic crystal can be created with feature height in the range of 30 nm to 200 nm. Air channels are formed in the valleys between the optical structures 30. The optical structures 30 can have the same refractive index as the waveguide medium with n greater than 1.5. The optical structures 30 are surrounded by air with a refractive index, n=1, and this mismatch in refractive index can allow diffraction. The diffraction efficiency can be controlled by applying a thin film coating on the horizontal surfaces of the optical structures 30. The coating material would usually (but not always) have a higher refractive index than the waveguide 14. In one embodiment a coating is applied with a refractive index of n~2.4.

In another embodiment the optical structures 30 can be embedded within the waveguide 14 medium. The optical structures 30 can therefore be provided entirely within the waveguide 14 medium. This requires a refractive index mismatch between the optical structures 30 and the waveguide medium 14 in order for diffraction to occur. This can be achieved by creating a waveguide 14 having a surface relief profile with optical structures 30 on one surface. A bonding material can then be applied on the optical structures 30 and this can be bonded to a cover piece having the same refractive index as the waveguide 14. By choosing a bonding material that has a different (usually higher) refractive index than the waveguide medium 14 a unified waveguide 14 can be created between the original waveguide and the cover piece, with the bonding material sandwiched in between. In this design the bonding material has the same shape as the optical structures 30, but a different refractive index from the surrounding waveguide medium.

The regular arrangement of optical structures 30 in the array may be thought of as a number of effective diffraction gratings or diffractive optical structures. In particular it is possible to define a grating H1 with optical structures 30 aligned along the y-axis with adjacent rows of optical structures separated by a perpendicular distance p. Grating H2 is arranged with rows of optical structures 30 at an angle of +30° to the x-axis, with adjacent rows separated by a perpendicular distance p. Finally, grating H3 is arranged with rows of optical structures at an angle of −30° to the x-axis, with adjacent rows separated by a perpendicular distance p. The unit cell 32 of the photonic crystal may be defined in terms of the lattice constant q in a skew frame of reference. The values p and q are related to one another by the expression) q=p/Cos(30°). It has been found that an effective photonic crystal can be created with values of p in the range of 200 nm to 700 nm.

When light from an input grating received along the x-axis is incident on the photonic crystal 12 it undergoes multiple simultaneous diffractions by the diffractive optical elements. Light can be diffracted into a zero order, which is a continuation of the propagation of the incident light. Light can also be diffracted into a first diffraction order by grating H1. The first order is coupled out of the waveguide 14 in a positive direction along the z-axis, towards a viewer which can be defined as the straight to eye (STE) order. Light can also be diffracted into a first diffracted order by the H2 diffractive optical structure. This first order is diffracted at 60° to the x-axis, and this light beam goes on to make further interactions with the photonic crystal. Light can also be diffracted into a first diffracted order by the H3 diffractive optical structure. This first order is diffracted at 60° to the x-axis, and this light beam goes on to make further interactions with the photonic crystal. A subsequent diffractive interaction with the H2 diffractive optical structure can couple light out of the waveguide 12 in the positive z-axis towards a viewer. Thus, light can be coupled out of the waveguide at each point, and yet light can continue to expand within the waveguide 12 in two dimensions. The symmetry of the photonic crystal means that every exit beam has the same angular and chromatic properties as the input beam, which means that a polychromatic (as well as a monochromatic) light source may be used as the input beam with this photonic crystal arrangement.

The photonic crystal can allow simultaneous and rapid expansion of light in two dimensions so that the input light can fill a two-dimensional display screen. This can allow an ultra-compact display because the waveguide size can be kept to a minimum due to the two-dimensional beam expansion.

As can be seen from FIG. 4 the arrangement of the optical structures has hexagonal symmetry. It has been previously identified that the hexagonal symmetry of the unit cell is the most effective way to achieve uniform bright images. One representation of the unit cell 32 for the arrangement of optical structures is shown in FIG. 4. As can be seen the cross optical structure 30 is within the unit cell. None of the sides of the cross shaped optical structure extend to the edge of the unit cell 32. In this way there is a spacing between neighbouring optical structures 30 and they are not joined to one another. The spacing between neighbouring optical structures is shown by reference 2a and 2b in FIG. 4. In the example of FIG. 4 spacing 2a and 2b are the same magnitude.

Figure 5:
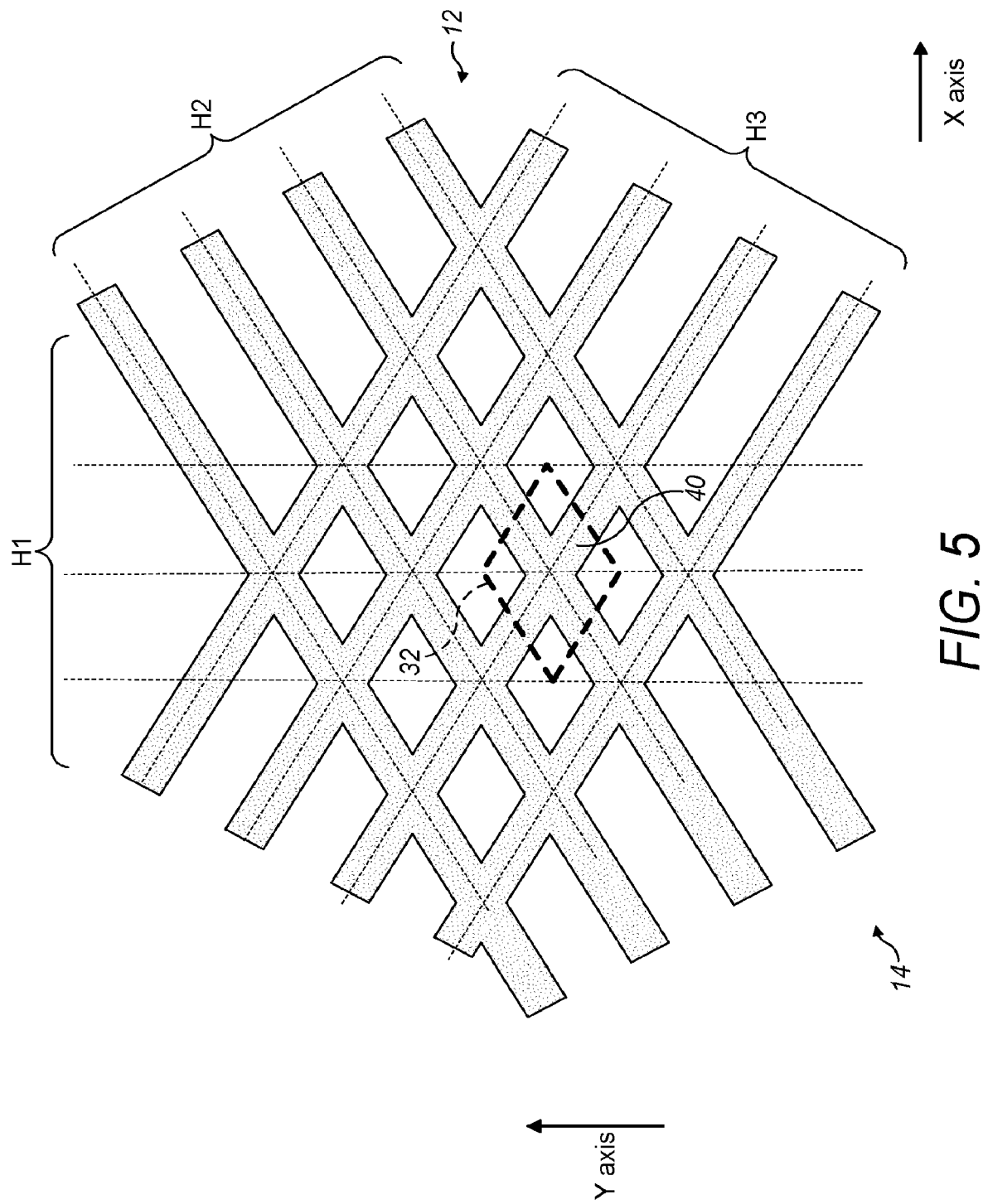
FIG. 5 is a top view of a photonic crystal for use in a waveguide in an embodiment of the invention.

FIG. 5 is a top view of part of a photonic crystal 12, which is a further example array of optical structures 40 that are provided within a waveguide 14. The shape of the optical structure within the unit cell is a cross shape as in FIG. 4. Therefore, when viewed as a single unit cell the cross shape of the optical structure has 12 sides. The discussion above regarding optical structure 30 likewise applies to optical structure 40. However, the spacing between neighbouring optical structures 40 as labelled a and b in FIG. 4, are zero in the example in FIG. 5. In this way, optical structures 40 of neighbouring unit cells are attached to one another forming a grid-like shape.

As for the example in FIG. 4, the regular arrangement of optical structures 40 in the array in FIG. 5 may be thought of as a number of effective diffraction gratings or diffractive optical structures.

In these arrangements the optical structures 30 40 have straight sides that are parallel to the diffractive optical structures H2, H3. Thus, the sides of the cross shapes are angled at ±30° to the x-axis, which is the direction along which input light is received from the input grating 1.

A surprising advantage has been found with the optical structures 30 and 40 of the present invention, in that there is an improvement in the angular uniformity of colours across the field of view, when compared to the circular and non-circular optical structures known in the art, including those shown in FIG. 3.

This is in addition to the increase in the diffraction efficiencies of the diffractive optical structures H1, H2, H3 of FIGS. 4 and 5 compared to circular structures. This increases the proportion of light that is diffracted into the first orders by the structures H2, H3, and decreases the proportion of light that is diffracted into the first order by structure H1. This can reduce the striping effect which has been observed with circular structures, which significantly improves the utility of the waveguide 14.

Figure 6A:
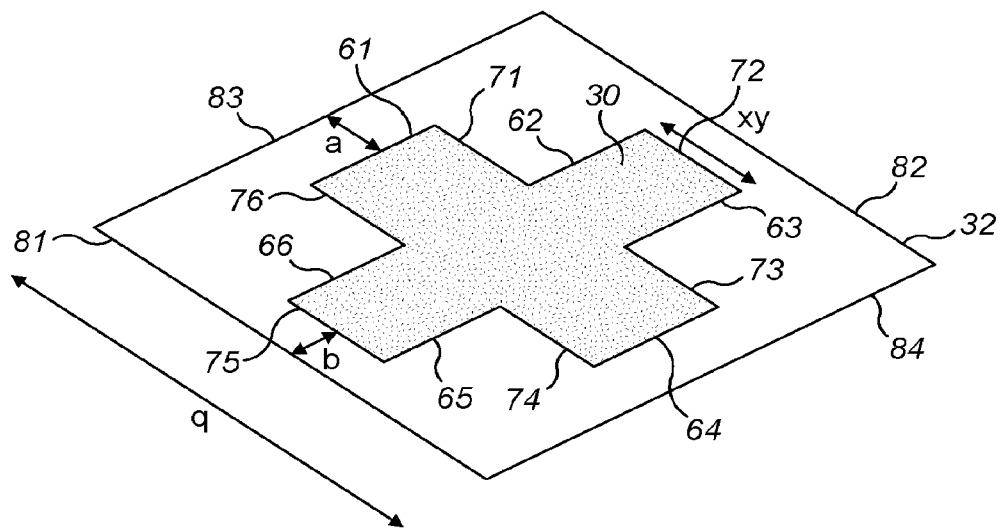
FIGS. 6(a) and (b) show a number of examples of optical structures with different shapes that can be used in a photonic crystal in a waveguide in an embodiment of the invention.

FIG. 6 shows a single unit cell 32 of two example shapes for the optical structures which can be used to improve the angular uniformity throughout the field of view. The first optical structure 30 shown in FIG. 6(a) is the cross structure as shown in FIG. 4. The cross structure is within a parallelogram 32, which indicates the arrangement of optical structures 30 within the photonic crystal 12. In other words the parallelogram indicates the unit cell 32. The shape of the optical structure 30 is a cross shape having 12 sides. Six of the sides, sides 61, 62, 63, 64, 65, and 66, have respective normal vectors at a first angle. The other six of the sides, sides 71, 72, 73, 74, 75, 76 having respective normal vectors at a second angle which is different to the first angle.

The sides 61, 62, 63, 64, 65, and 66 are parallel to sides 81 and 82 of the unit cell. In the arrangement shown in FIG. 4 sides 81 and 82 of the unit cell 32, and sides 61, 62, 63, 64, 65, and 66 are parallel to grating H3.

The sides 71, 72, 73, 74, 75, and 76 are parallel to sides 83 and 84 of the unit cell. In the arrangement shown in FIG. 4 sides 83 and 84 of the unit cell 32, and sides 71, 72, 73, 74, 75, and 76 are parallel to grating H2.

The optical structure has substantially four internal angles of 60°. The internal angles at the vertices between the sides 61 and 76, between the sides 72 and 63, between the sides 73 and 64, and between the sides 75 and 76 are each substantially 60°.

The optical structure has substantially four internal angles of 120°. The internal angles at the vertices between the sides 61 and 71, between the sides 62 and 72, between the sides 64 and 74, and between the sides 65 and 75, are each substantially 120°.

The optical structure has substantially two internal angles of 240°. These are the angles between the sides 71 and 62, and between the sides 74 and 65.

The optical structure has substantially two internal angles of 300°. These are between the sides 66 and 76, and between the sides 63 and 73.

The lattice constant, p, is equal to the length of one of the sides of the parallelogram. The spacing between the corners of the cross and the parallelogram is denoted by the references a and b, as in FIG. 4. In the present arrangement the spacing a and b are equal.

Figure 6B:
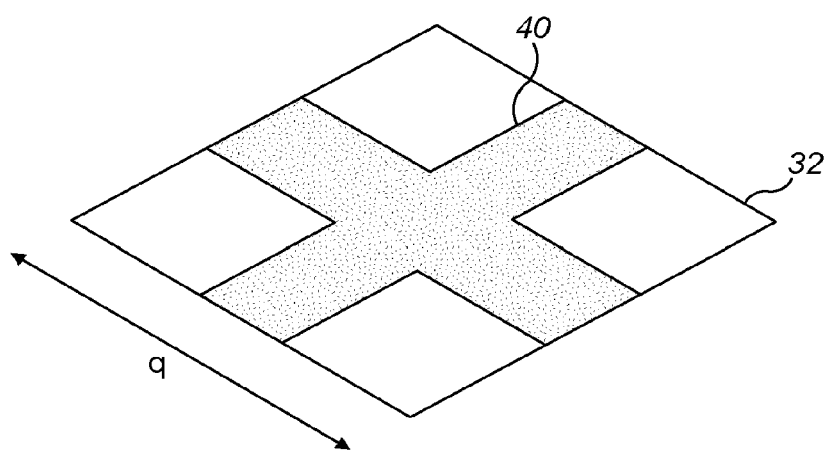

The second optical structure 40 shown in FIG. 6(b) is the cross structure as shown in FIG. 5. The cross structure 40 is also within a parallelogram 32, which indicates the arrangement of optical structures 10 within the photonic crystal 12. As defined on the level of the unit cell the cross structure 40 has 12 sides similar to the cross structure 30. The only difference between the optical structure 30 and the second optical structure 40 is that there is no spacing (a and b) between the cross structure 40 and the parallelogram 32. Having unit cells with this arrangement of optical structure results in the optical structures 40 forming a grid arrangement.

Although not labelled in FIG. 6(b) the sides and the angles between the sides of the optical structure 40 is the same as optical structure 30 shown in FIG. 6(a).

As explained above, for all of the optical structures shown in FIG. 6 the shapes include sides that are substantially parallel to the diffractive optical structures H1, H2 in the photonic crystal 12. However, other viable embodiments are envisaged where the optical structures have sides that are non-parallel to the structures H1, H2.

Vertices are present in all of the optical structures shown in FIG. 6. In practice these vertices would have slightly rounded corners, depending on the degree of magnification that is used when they are examined.

As explained above, the angular response of the waveguide is defined by a number of consequent diffraction events of the incoming light. As the input light consists of a number of rays with different polar angles (denoted as θ and ϕ) it is important that the diffraction orders in the waveguide have uniform response efficiencies with respect to the θ and ϕ angles. The optical structures of the present invention address this issue.

Figure 7:
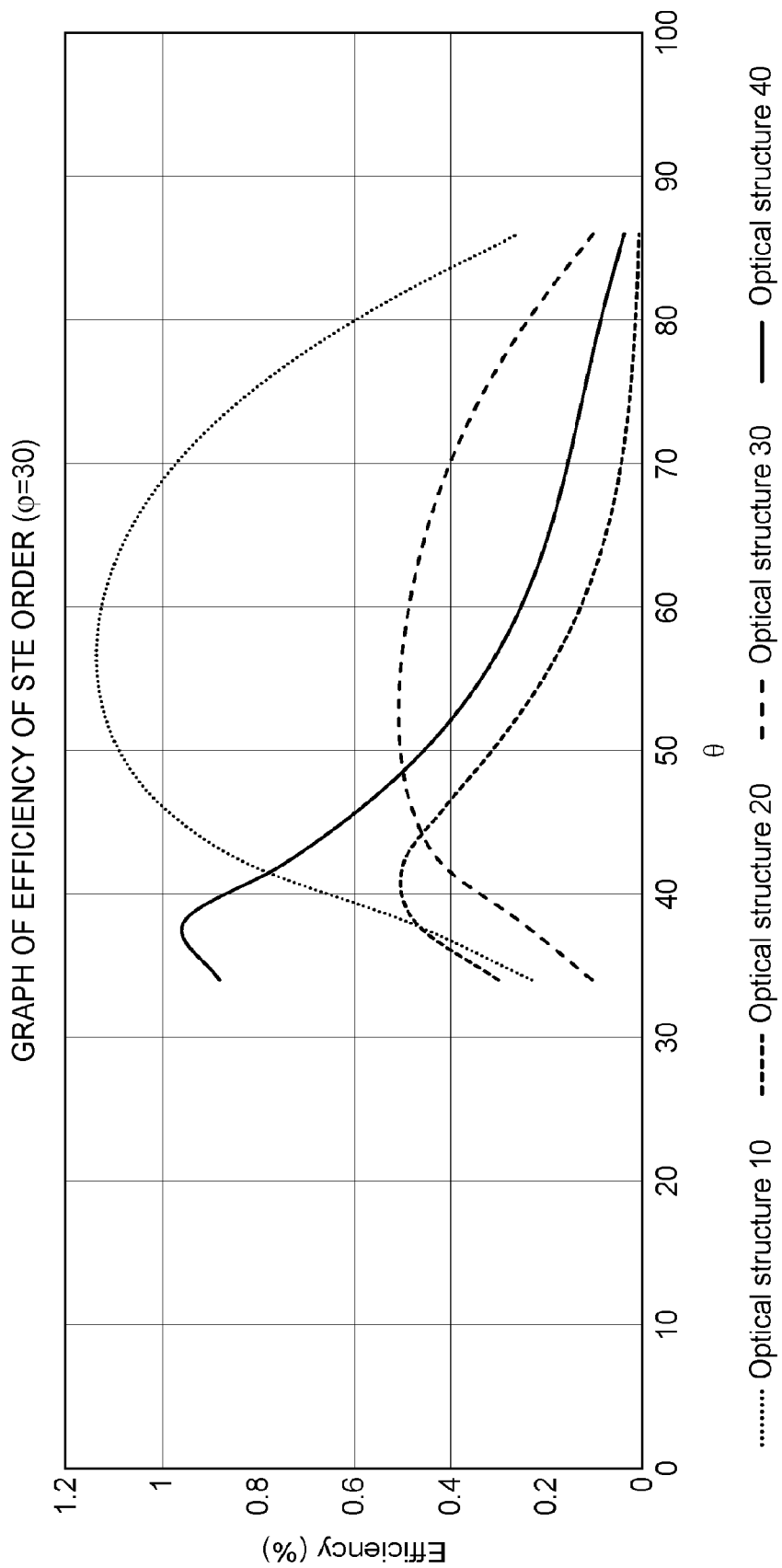
FIG. 7 is a graph of angular efficiency of the Straight To Eye (STE) order for light interacting with different types of photonic crystals.

FIG. 7 is a graph showing efficiency with which input light is coupled directly into the straight to eye (STE) order when it interacts with the photonic crystals shown in FIGS. 3, 4 and 5 formed by the array of the optical structures 10, 20, 30 and 40 respectively. As can be seen the optical structure 30 provides the most uniform angular response.

Figure 8:
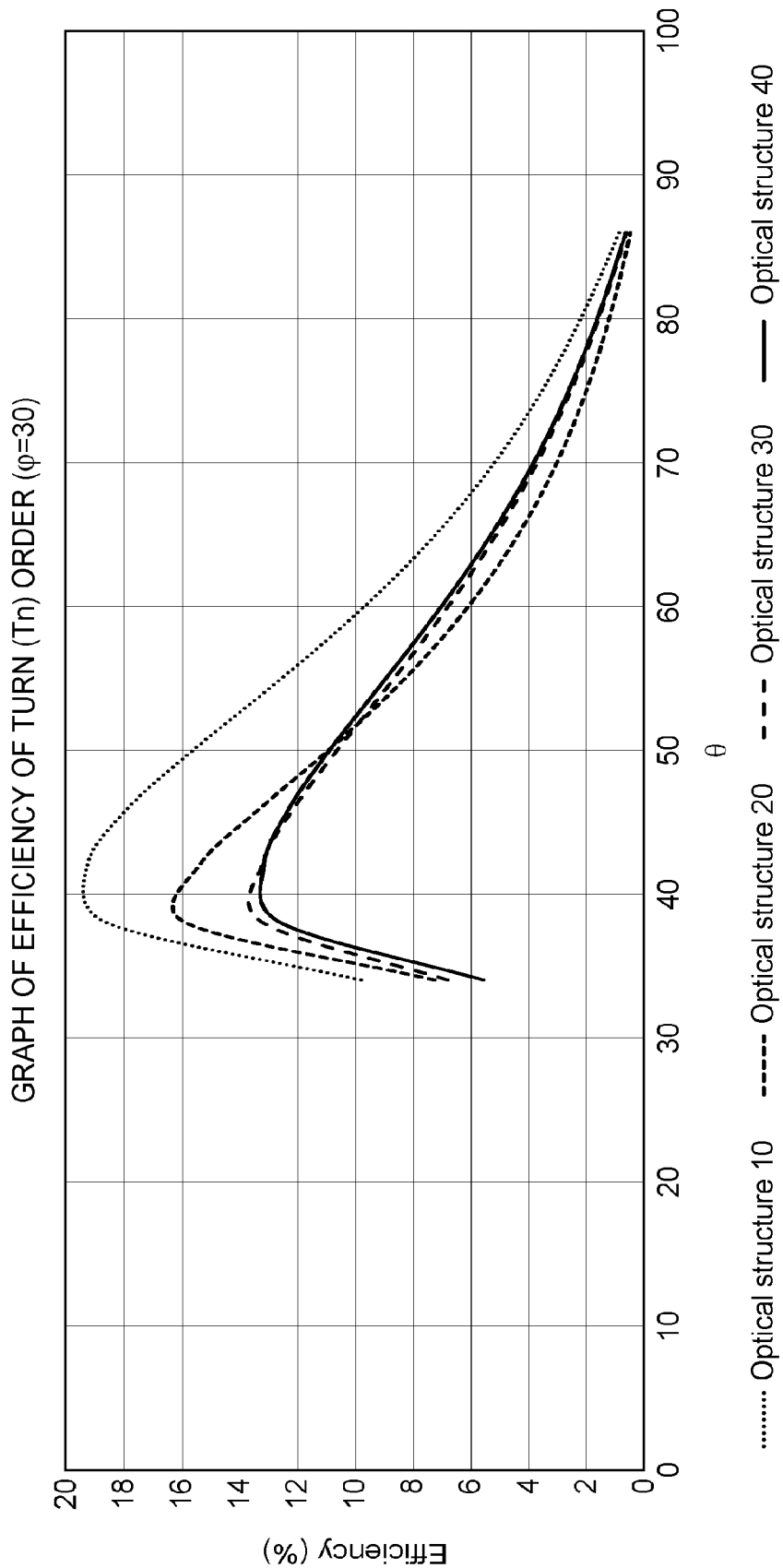
FIG. 8 is a graph of angular efficiency of the Turn (Tn) order for light interacting with different types of photonic crystals.

FIG. 8 is a graph showing efficiency with which light is turned (Tn) when it interacts with the photonic crystal as shown in FIGS. 3, 4 and 5 formed by the array of the optical structures 10, 20, 30 and 40 respectively. This is called the turn order efficiency. The Tn diffraction order is when the input light is turned by +60° to the x-axis, rather than being coupled straight out into the STE order. The Tn order promotes the expansion of the image in 2D.

As can be seen from FIG. 8, the cross optical structures 30 and 40 have a higher angular bandwidth (as indicated by their full width at half maximum) than the simple parallelogram 10 and the notched parallelogram 20 optical structures, with only a slightly reduced turn efficiency. The higher angular bandwidth advantageously leads to more uniform turning.

Figure 9:
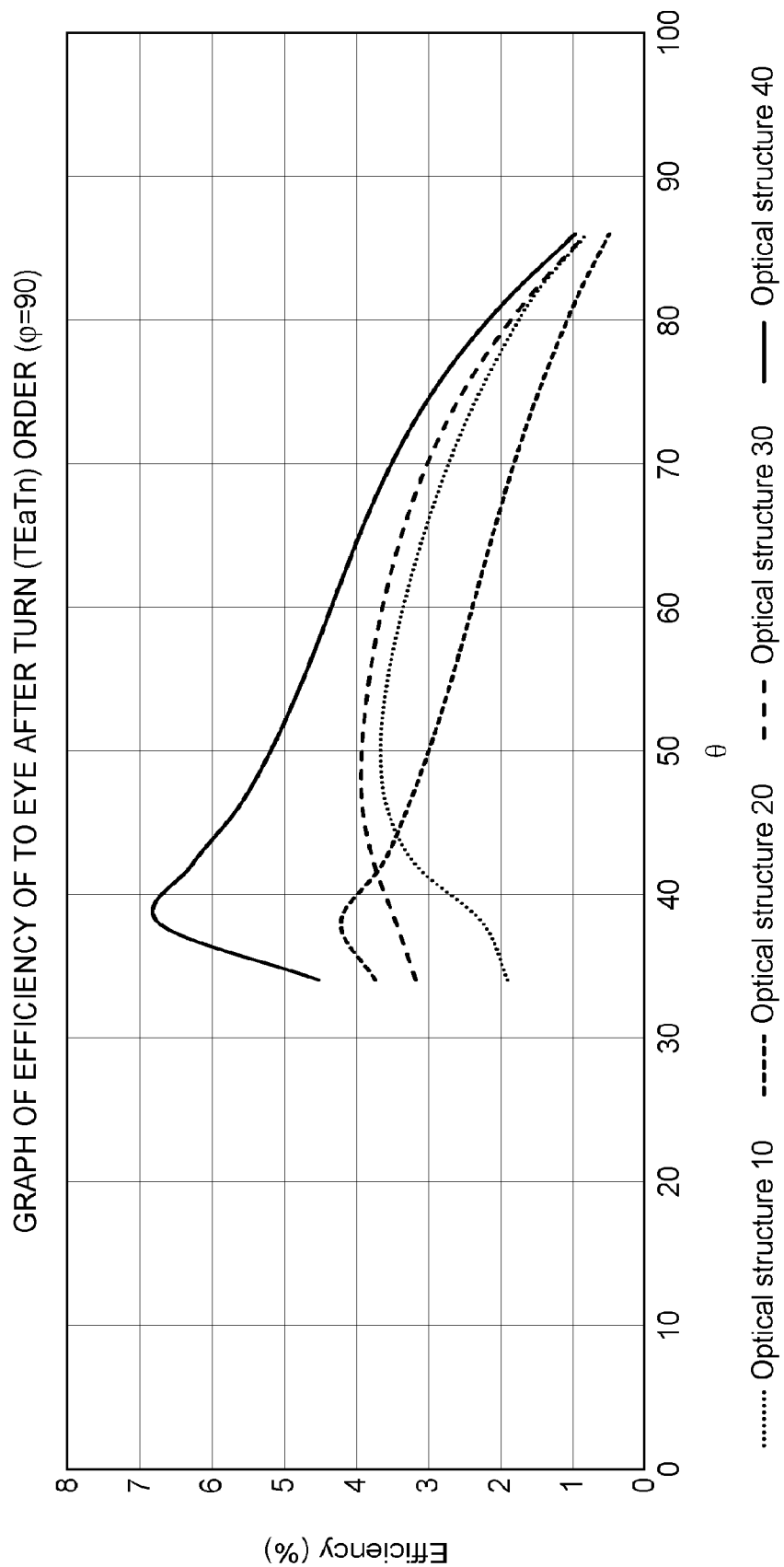
FIG. 9 is a graph of angular efficiency of the To Eye After Turn (TEaTn) order for light interacting with different types of photonic crystals.

FIG. 9 is a graph showing efficiency against the To Eye after Turn (TEaTn) order, for the photonic crystal as shown in FIGS. 3, 4 and 5 formed by the array of the optical structures 10, 20, 30 and 40 respectively. The TEaTn order is the light that is coupled out of the waveguide to the user's eye the next time the light interacts with the optical structures after turning. This is responsible for the brightness of the image away from the central stripe region. As can be seen the highest efficiency of the TEaTn order is the cross optical structure 40.

Figure 10:
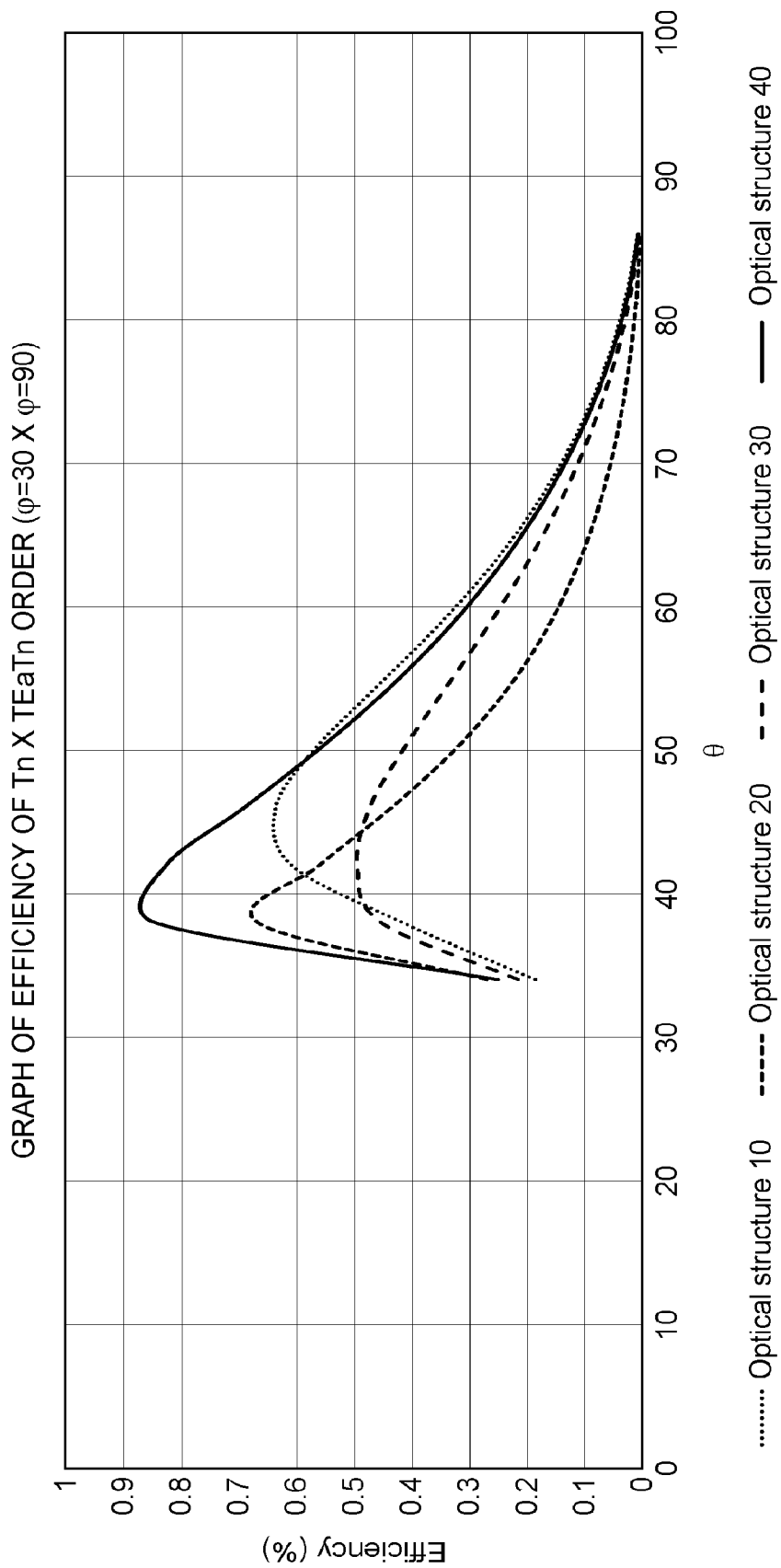
FIG. 10 a graph of angular efficiency of the Turn order multiplied by the To Eye After Turn (TEaTn) order for light interacting with different types of photonic crystals.

FIG. 10 is a graph showing efficiency against Tn order multiplied by TEaTn. This demonstrates the light extracting efficiency of the structures away from the central band. As can be seen the cross optical structure 40 provides the best extraction efficiencies, showing that it makes more efficient use of the input light.

The effectiveness of the diffraction orders discussed above determines whether the central stripe (banding) occurs or not. It has been found that when:

$$STE \text{ order}/(Tn \text{ order} \times TEaTn) = 1$$

the image has the best uniformity. Whereas for values of $$STE \text{ order}/(Tn \text{ order} \times TEaTn) > 3$$

The central stripe becomes very pronounced thus affecting the uniformity.

Figure 11:
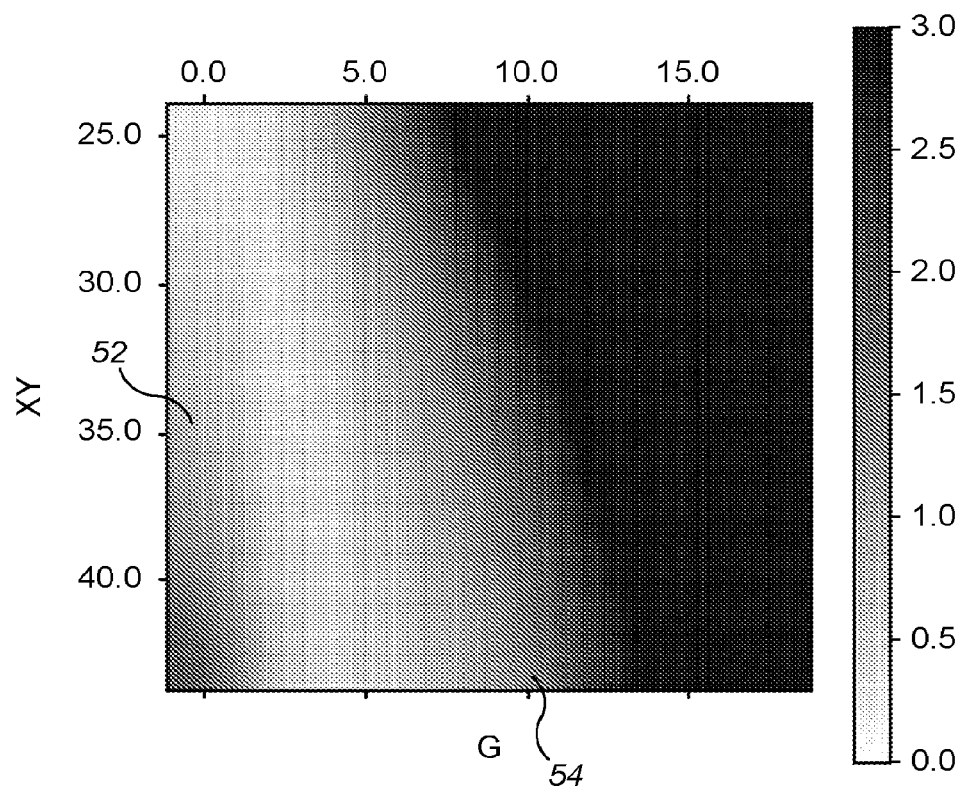
FIG. 11 is a plot showing how the uniformity varies for various arrangements of photonic crystal for use in a waveguide according to the embodiments of the invention.

The value of STE order/(Tn order×TEaTn) has been found to vary based on the specific arrangement of the optical structures 30 and 40 with respect to the unit cell 32 as shown in FIG. 11. FIG. 11 shows a plot of how variations in the arrangement of optical structures 30 and 40 can lead to a variation in the uniformity. The value G denoted in FIG. 11 is equivalent to the distance denoted by a and b in FIG. 6, such that G=a=b. In this way G denotes half of the size of the gap between neighbouring optical structures. As can be seen from FIG. 6 reference xy used in FIG. 6 denotes the size of the arm of the cross. Both G and xy are defined in terms of their percentage lengths compared to lattice constant length q. As can be seen from FIG. 11 changes in the sizes of G and xy result in changes to the value of STE order/(Tn order×TEaTn). When G=0, i.e. the optical structure 40 in FIG. 6, an optimal value of xy is around 35% as denoted by reference 52 in FIG. 11. By varying G, i.e. the optical structure 30 in FIG. 6, it has been found that an optimal value of STE order/(Tn order×TEaTn) may be achieved by having G=10% and xy=43%, as indicated by reference 54 in FIG. 11.

However, from FIG. 11 it can be seen that a value of G anywhere between 5% to 10% provides a preferable range (i.e. where the gap between neighbouring optical elements (2G) is between 10 to 20% of the value of the lattice constant).

Demonstration of the improved angular efficiency using the optical structures 30, 40 of the present invention can be found in FIG. 12. FIG. 12 shows a 2D map of angular intensities across the field of view of a waveguide for various optical structures. Specifically, the angular intensity across the field of view is shown in FIG. 12 for (a) the parallelogram optical structure 10, (b) the notched parallelogram optical structure 20, (c) the cross optical structure 30, and (d) the grid optical structure 40. The x-axis shows the field of view in the x-axis (FoVx) and the y-axis shows the field of view in the y-axis (FoVy).

Figure 12A:
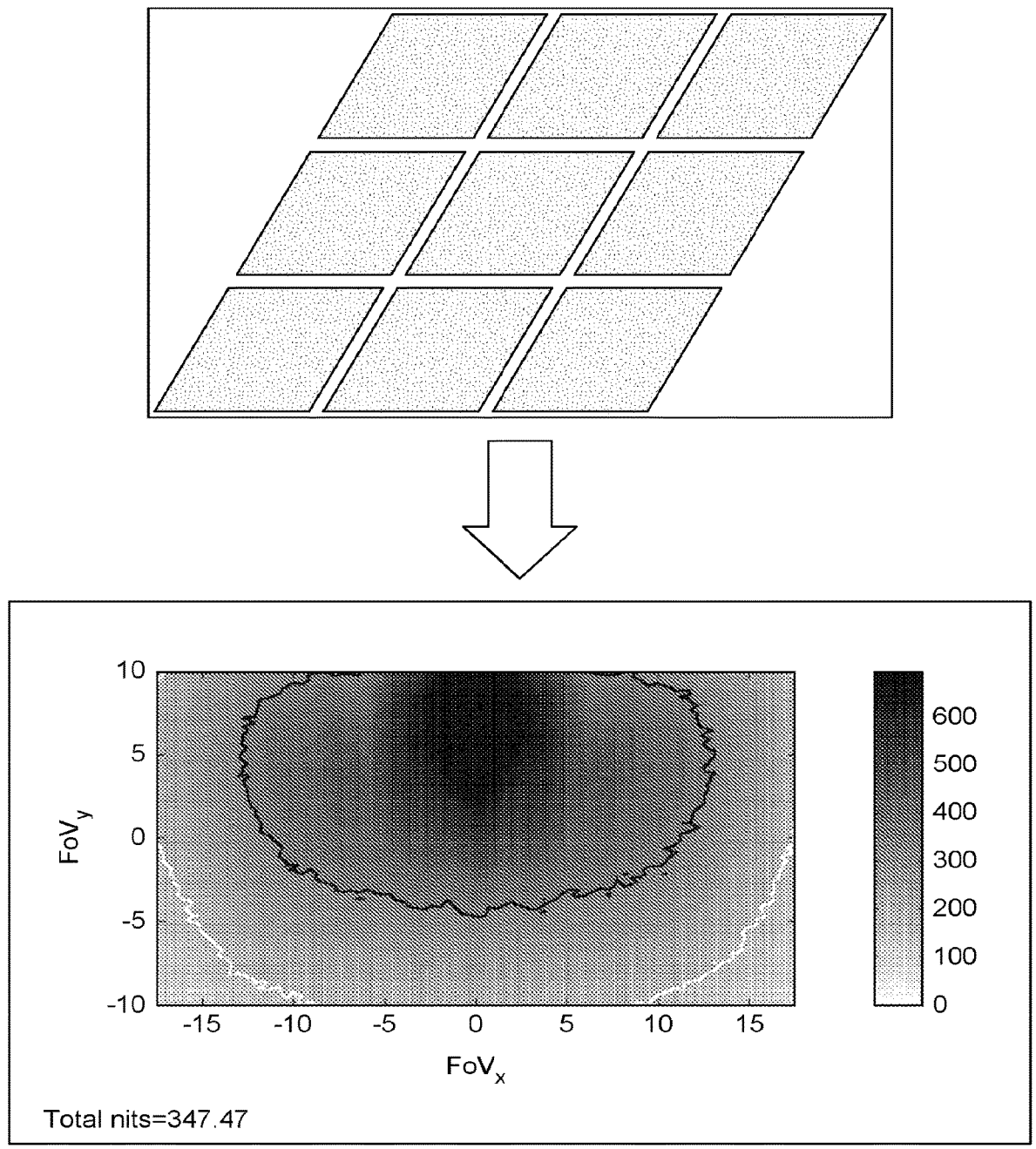
FIG. 12(a) to (d) shows plots of angular uniformity across the field of view for various photonic crystals for use in waveguides.
Figure 12B:
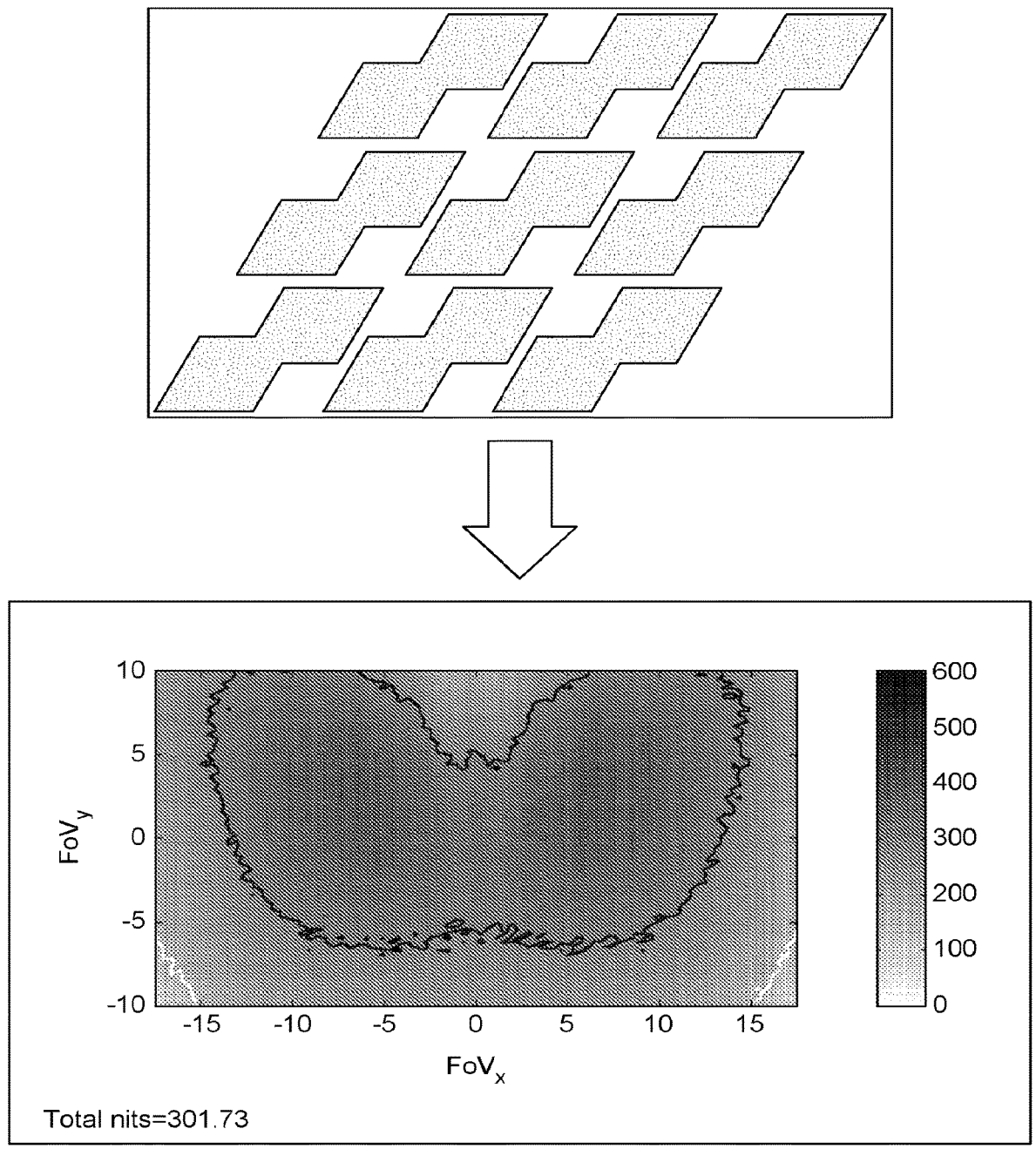

As can be seen from FIG. 12(a) for the parallelogram optical structure 10 results in a central section of the field of view having the highest intensity, demonstrating a central stripe. This central region of higher intensity is avoided when using the notched parallelogram optical structure 20, as can be seen from FIG. 12(b).

Figure 12C:
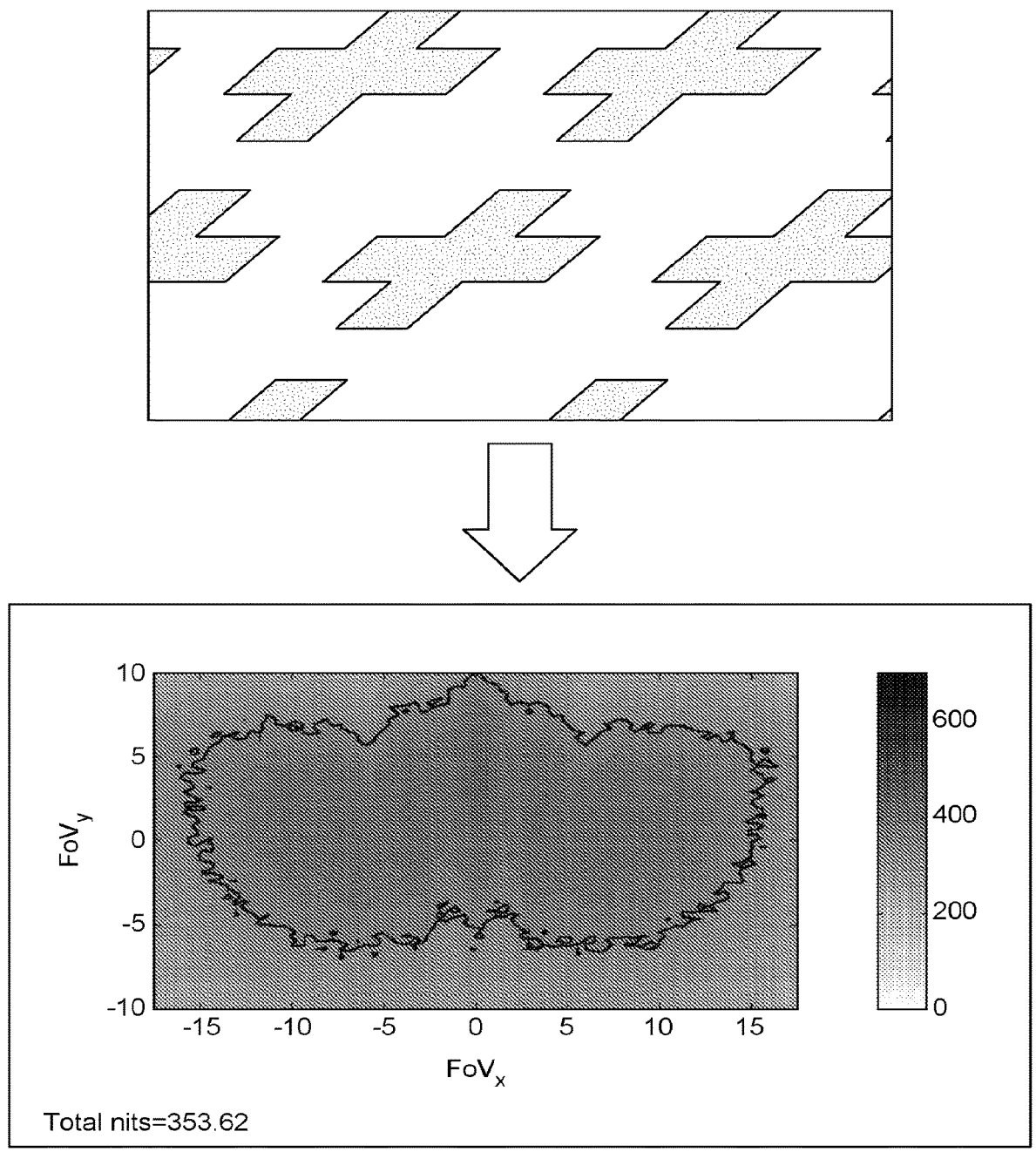
Figure 12D:
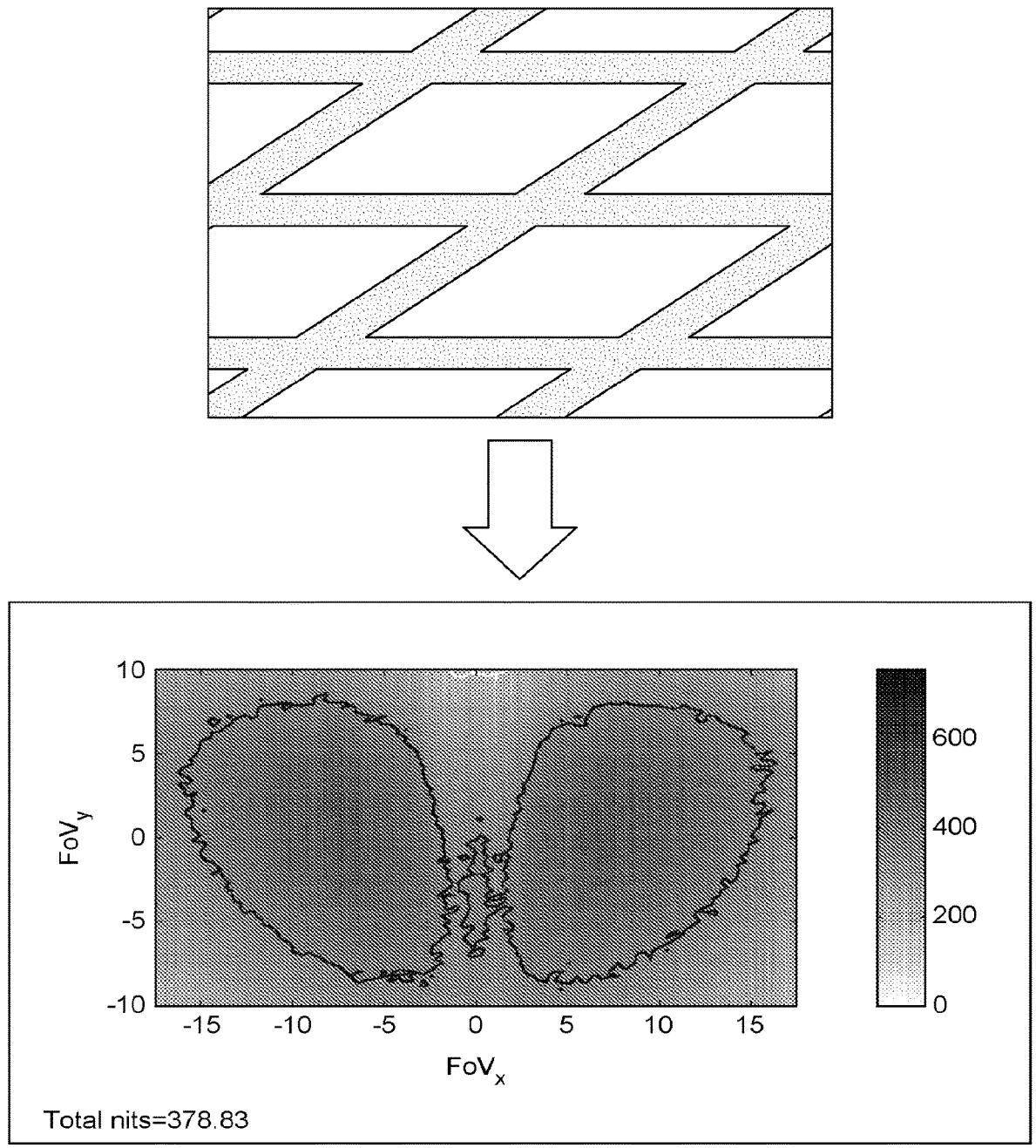

FIG. 12(c) shows that the cross optical structure 30 has the best angular uniformity of colours across the field of view compared to the other optical structures as shown in FIGS. 12(a) (b) and (d). This can be seen with the bottom corners of the 2D map in FIG. 12(c) having a more uniform coverage of intensity compared to that of the other optical structures. FIG. 12(d) also shows improved angular uniformity compared to the performance of the optical structures 10 and 20 in FIGS. 12(a) and (b), albeit not as good as for the optical structure 40 in FIG. 12(c).

Although the cross optical structure 30 shows the best angular uniformity, the grid optical structure 40 has the advantage of fabrication ease. In addition, due to the simplicity of its shape it demonstrates robust fabrication tolerances, with any small deviations in its size during the manufacturing process not greatly leading to a reduction in its performance.

This means that techniques can be used that are cheaper and faster than the conventionally used Gaussian electron beam lithography, which is typically used for the manufacture of the parallelogram optical structure 10 and the notched parallelogram optical structure 20, due to the requirement to provide control of the resolution of the optical structures below 100 nm.

Alternative techniques to manufacture optical structure 40 and optical structure 30, can be used including variable shape electron beam lithography, two photon polymerization lithography or multiple electron beam lithography. The variable shape electron beam lithography method enables structures to be created using simple geometrical shapes of a larger size or pre-defined masks, which increases the writing speed and reduces the cost of manufacture. The two photon polymerization lithography is an optical technique which uses the effect of two photon polymerization to create 3D structures below the diffraction limit. Multiple electron beam lithography uses a large number of parallel electron beams to simultaneously expose the full area of the wafer. The multiple electron beam method achieves ultrafast writing speed, whilst compromising on resolution, thus being suitable for simpler shapes.

However, alternative manufacturing methods known to the skilled person may be used to manufacture the optical structures 30 and 40.

The invention claimed is:

1. A waveguide configured for an augmented reality or virtual reality display, comprising:
   a plurality of optical structures in a photonic crystal, adjacent optical structures being spaced apart from each other by a gap;

the plurality of optical structures being arranged in an array to provide at least two diffractive optical elements, each of the two diffractive optical elements being configured to receive light from an input direction and couple it towards the other of the two diffractive optical elements which can then act as an output diffractive optical element, providing outcoupled orders towards a viewer;

each optical structure of the plurality of optical structures respectively having a cross shape, when viewed in a plane of the waveguide, comprising twelve substantially straight sides, six of the sides having respective normal vectors at a first angle, and the other six of the sides having respective normal vectors at a second angle which is different to the first angle;

the arrangement of the plurality of optical structures in the array having hexagonal symmetry.

2. The waveguide of claim 1, wherein:

the adjacent optical structures in the array are spaced apart from each another by the gap in a direction parallel to the diffractive optical elements;

the optical structures have a physical extent that extends in the direction parallel to the optical elements;

a lattice constant is defined by a sum of the physical extent and the gap; and the gap is defined as at least 1% of the extent of the lattice constant.

3. The waveguide of claim 1, wherein the cross shape has internal angles that add up to substantially 1800°.

4. The waveguide of claim 1, wherein the first angle and the second angle are at substantially ±30° to the input direction.

5. The waveguide of claim 1, wherein the plurality of optical structures exhibit differences in refractive index from a surrounding waveguide medium.

6. The waveguide of claim 1, wherein the plurality of optical structures are surface relief structures on the surface of the waveguide.

7. A method of manufacture of a waveguide for an augmented reality or virtual reality display, the method comprising:

providing a plurality of optical structures in a photonic crystal, adjacent optical structures being spaced apart from each other by a gap;

arranging the plurality of optical structures in an array to provide at least two diffractive optical elements, each of the two diffractive optical elements being configured to receive light from an input direction and couple it towards the other of the two diffractive optical elements which can then act as an output diffractive optical element, providing outcoupled orders towards a viewer; and providing the plurality of optical structures respectively each with a cross shape, when viewed in a plane of the waveguide, comprising twelve substantially straight sides, six of the sides having respective normal vectors at a first angle, and the other six of the sides having respective normal vectors at a second angle which is different to the first angle;

the arrangement of the plurality of optical structures in the array having hexagonal symmetry.

8. The method of claim 7, wherein:

the adjacent optical structures in the array are spaced apart from each another by the gap in a direction parallel to the diffractive optical elements;

the optical structures have a physical extent that extends in the direction parallel to the optical elements;

a lattice constant is defined by a sum of the physical extent and the gap; and the gap is defined as at least 1% of the extent of the lattice constant.

9. The method of claim 7, comprising applying a coating to the plurality of optical structures.

10. The method of claim 7, wherein the cross shape has internal angles that add up to substantially 1800°.

11. The method of claim 7, wherein the first angle and the second angle are at substantially ±30° to the input direction.

12. The method of claim 7, wherein the plurality of optical structures exhibit differences in refractive index from a surrounding waveguide medium.

13. The method of claim 7, wherein the plurality of optical structures are surface relief structures on the surface of the waveguide.

14. An augmented reality or virtual reality display comprising a waveguide, the waveguide comprising:

a plurality of optical structures in a photonic crystal, adjacent optical structures being spaced apart from each other by a gap;

the plurality of optical structures being arranged in an array to provide at least two diffractive optical elements, each of the two diffractive optical elements being configured to receive light from an input direction and couple it towards the other of the two diffractive optical elements which can then act as an output diffractive optical element, providing outcoupled orders towards a viewer;

each optical structure of the plurality of optical structures respectively having a cross shape, when viewed in a plane of the waveguide, comprising twelve substantially straight sides, six of the sides having respective normal vectors at a first angle, and the other six of the sides having respective normal vectors at a second angle which is different to the first angle;

the arrangement of the plurality of optical structures in the array having hexagonal symmetry.

15. The augmented reality or virtual reality display of claim 14, wherein:

the adjacent optical structures in the array are spaced apart from each another by the gap in a direction parallel to the diffractive optical elements;

the optical structures have a physical extent that extends in the direction parallel to the optical elements;

a lattice constant is defined by a sum of the physical extent and the gap; and the gap is defined as at least 1% of the extent of the lattice constant.

16. The augmented reality or virtual reality display of claim 14, wherein the cross shape has internal angles that add up to substantially 1800°.

17. The augmented reality or virtual reality display of claim 14, comprising augmented reality glasses or goggles.

18. The augmented reality or virtual reality display of claim 14, comprising a virtual reality headset.

19. The augmented reality or virtual reality display of claim 14, wherein the waveguide comprises a transparent display screen.

20. The augmented reality or virtual reality display of claim 19, further comprising a projector configured to couple light into the waveguide.

* * * * *

UNITED STATES PATENT AND TRADEMARK OFFICE
CERTIFICATE OF CORRECTION

PATENT NO. : 12,339,460 B2
APPLICATION NO. : 18/596415
DATED : June 24, 2025
INVENTOR(S) : Alexeev et al.

It is certified that error appears in the above-identified patent and that said Letters Patent is hereby corrected as shown below:

In the Claims

In Column 12, Line 12, in Claim 11, delete "+30°" and insert --±30°-- therefor

Signed and Sealed this
Fourteenth Day of October, 2025

John A. Squires
*Director of the United States Patent and Trademark Office*